(12) United States Patent
Happonen

(10) Patent No.: US 8,718,715 B2
(45) Date of Patent: May 6, 2014

(54) SHARING FUNCTIONALITY

(75) Inventor: Aki Petri Happonen, Kiiminki (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 699 days.

(21) Appl. No.: 12/494,828

(22) Filed: Jun. 30, 2009

(65) Prior Publication Data
US 2010/0331022 A1      Dec. 30, 2010

(51) Int. Cl.
  *H04M 1/00*      (2006.01)
(52) U.S. Cl.
  USPC .......................................... 455/566; 715/863
(58) Field of Classification Search
  USPC ........... 455/566, 556.1–556.2, 90.1; 715/863; 345/619, 625; 382/276; 705/500
  See application file for complete search history.

(56) References Cited

U.S. PATENT DOCUMENTS

| | | | |
|---|---|---|---|
| 2007/0130183 A1* | 6/2007 | Morris | 707/101 |
| 2007/0264975 A1 | 11/2007 | Bae et al. | |
| 2008/0158385 A1* | 7/2008 | Lee et al. | 348/231.3 |
| 2009/0140986 A1 | 6/2009 | Karkkainen et al. | |
| 2009/0288012 A1* | 11/2009 | Hertel et al. | 715/738 |

* cited by examiner

*Primary Examiner* — Christian Hannon
(74) *Attorney, Agent, or Firm* — Ziegler IP Law Group, LLC

(57) ABSTRACT

A user interface comprises a controller which is configured to display image data, receive input indicating a selection area comprising content corresponding to at least a portion of said image data, receive input indicating a movement of the selection area, identify a recipient and send the content to the recipient in response thereto.

14 Claims, 4 Drawing Sheets

SHARING FUNCTIONALITY

FIELD

The present application relates to a user interface, an apparatus and a method for sharing image data, and in particular to a user interface, an apparatus and a method for sharing a selection of image data to at least one recipient.

BACKGROUND

More and more electronic devices such as mobile phones, Media players, Personal Digital Assistants (PDAs) and computers both laptops and desktops are being used to display various image data such as media files (such as video files, slide shows and artwork for music files), internet content, image data representing maps, documents or other files and other image data.

A common problem is that sharing of images is quite slow or cumbersome and requires many steps to be taken by the user which is often thought of as being problematic for sharing images quickly and easily.

Especially if only a selection of an image is to be shared.

In contemporary devices a user has to take the following steps to share a selection in an image. First the selection has to be done and saved as a new file. The new file must then be specified to be sent to a recipient using a right click action, which to many users is regarded as unintuitive as they are used to the left click action. Then the recipient has to be specified.

This requires a user to perform unassociated actions each being initiated from different menus and which requires an in-depth understanding of the system being used.

An apparatus that allows an easy to use and to learn sharing functionality would thus be useful in modern day society.

SUMMARY

On this background, it would be advantageously to provide a user interface, an apparatus and a method that overcomes or at least reduces the drawbacks indicated above by providing an apparatus according to the claims.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the user interface, the apparatus, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
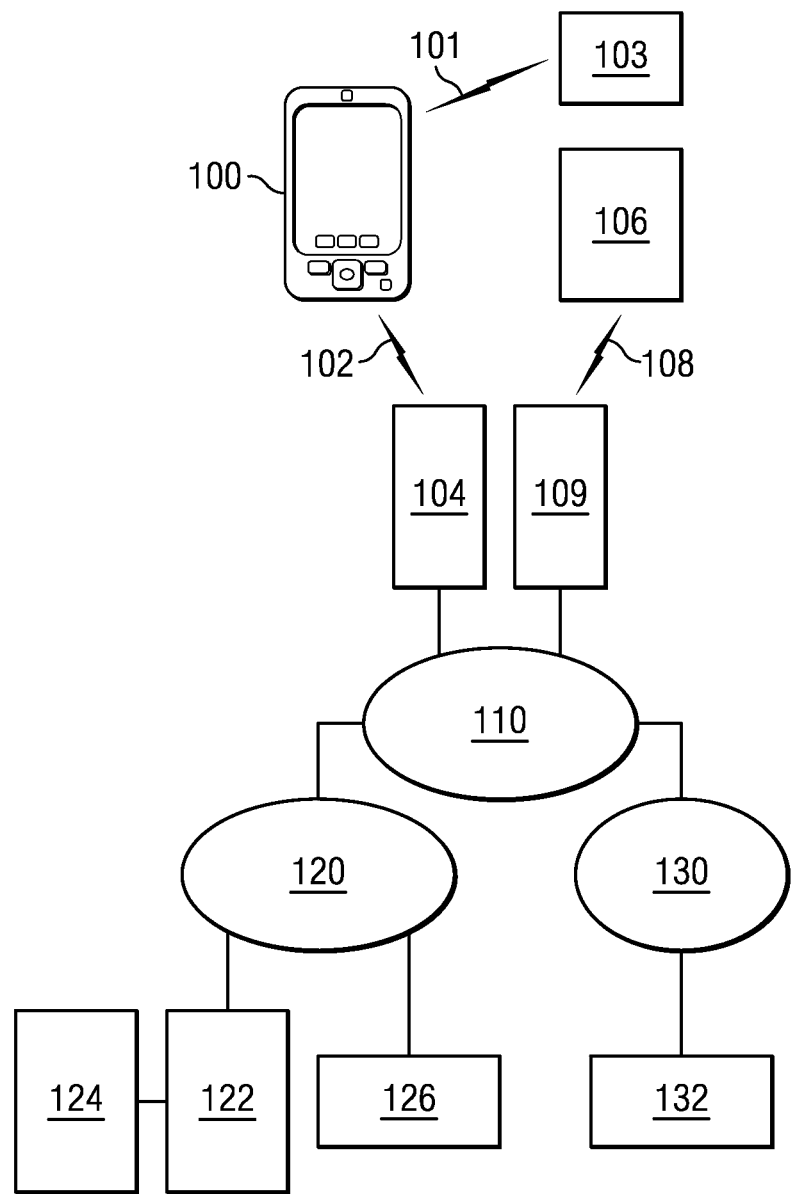
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency (RF) links 102, 108 via base stations 104, 109. The mobile telecommunications network 110 may be in compliance with any commercially available mobile telecommunications standard, such as Group Spéciale Mobile (GSM), Universal Mobile Telecommunications System (UMTS), Digital Advanced Mobile Phone system (D-AMPS), The code division multiple access standards (CDMA and CDMA2000), Freedom Of Mobile Access (FOMA), and Time Division-Synchronous Code Division Multiple Access (TD-SCDMA).

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 as is commonly known by a skilled person. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

A computer such as a laptop or desktop can also be connected to the network both via a radio link such as a WiFi link, which is the popular term for a radio frequency connection using the WLAN (Wireless Local Area Network) standard IEEE 802.11.

It should be noted that the teachings of this application are also capable of being utilized in an internet network of which the telecommunications network described above may be a part of.

It should be noted that even though the teachings herein are described solely to wireless networks it is in no respect to be limited to wireless networks as such, but it to be understood to be usable in the Internet or similar networks.

It should thus be understood that an apparatus according to the teachings herein may be a mobile communications terminal, such as a mobile telephone, a media player, a music player, a video player, an electronic book, a personal digital assistant, a laptop as well as a stationary device such as a desktop computer or a server.

Figure 2:
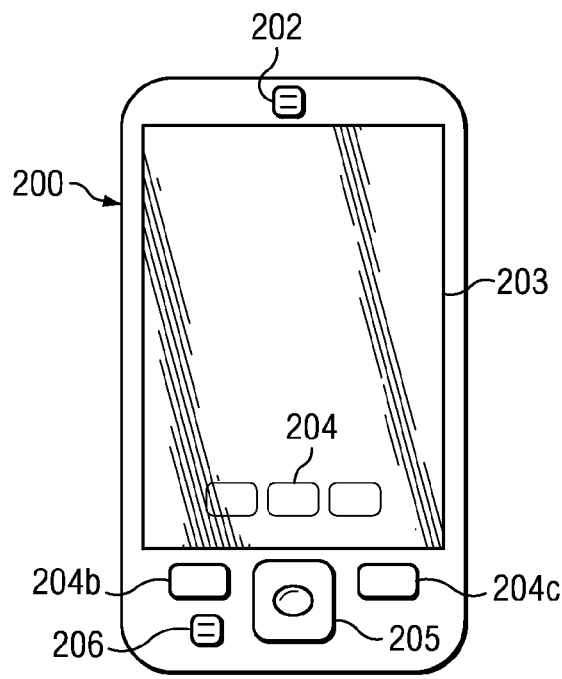
FIG. 2 is a view of an apparatus according to an embodiment.

An embodiment 200 of the mobile terminal 100 is illustrated in more detail in FIG. 2a. The mobile terminal 200 comprises a speaker or earphone 202, a microphone 206, a main or first display 203 and a set of keys 204 which may include keys such as soft keys 204b, 204c and a Joystick 205 or other type of navigational input device. In this embodiment the display 203 is a touch-sensitive display also called a touch display which displays various virtual keys 204a.

Figure 3:
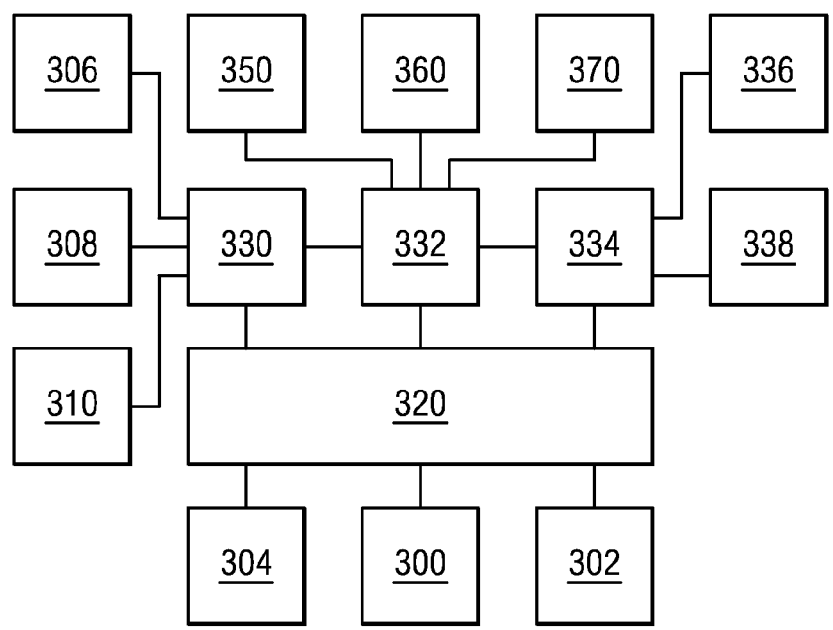
FIG. 3 is a block diagram illustrating the general architecture of an apparatus of FIG. 2 in accordance with the present application.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM), Read Only Memory (ROM), Electrically Erasable Programmable Read-Only Memory (EEPROM), flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a media file player 350, a notepad application 360, as well as various other applications 370, such as applications for voice calling, video calling, sending and receiving messages such as Short Message Service (SMS), Multimedia Message Service (MMS) or email, web browsing, an instant messaging application, a phone book application, a calendar application, a control panel application, a camera application, one or more video games, etc. It should be noted that two or more of the applications listed above may be executed as the same application.

The MMI 334 also includes one or more hardware controllers, which together with the MMI drivers cooperate with the first display 336/203, and the keypad 338/204 as well as various other Input/Output devices such as microphone, speaker, vibrator, ringtone generator, LED indicator, etc.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

The mobile terminal also has a Subscriber Identity Module (SIM) card 304 and an associated reader. As is commonly known, the SIM card 304 comprises a processor as well as local work and data memory.

In the following description it will be assumed that the display is a touch display and that a tap is performed with a stylus or finger or other touching means tapping on a position on the display. It should be noted that a tap may also be included by use of other pointing means such as a mouse or touch pad controlled cursor which is positioned at a specific position and then a clicking action is performed. This analogy is commonly known in the field and will be clear to a skilled person. In the description it will be assumed that a tap input comprises a clicking action at an indicated position.

FIG. 4 show a series of screen shot views of an apparatus 400 according to the teachings herein. It should be noted that such an apparatus is not limited to a mobile phone, but can be any apparatus capable of displaying image data.

Examples of such apparatuses are computers, media players, mobile phones, personal digital assistants (PDA), digital cameras, navigation devices such as GPS (Global Positioning System) devices, game consoles electronic books, Digital Video Disc players, television sets, photo and video cameras, electronic books and electronic dictionaries, The apparatus 400 has a display 403, which in this embodiment is a touch display.

Figure 4A:
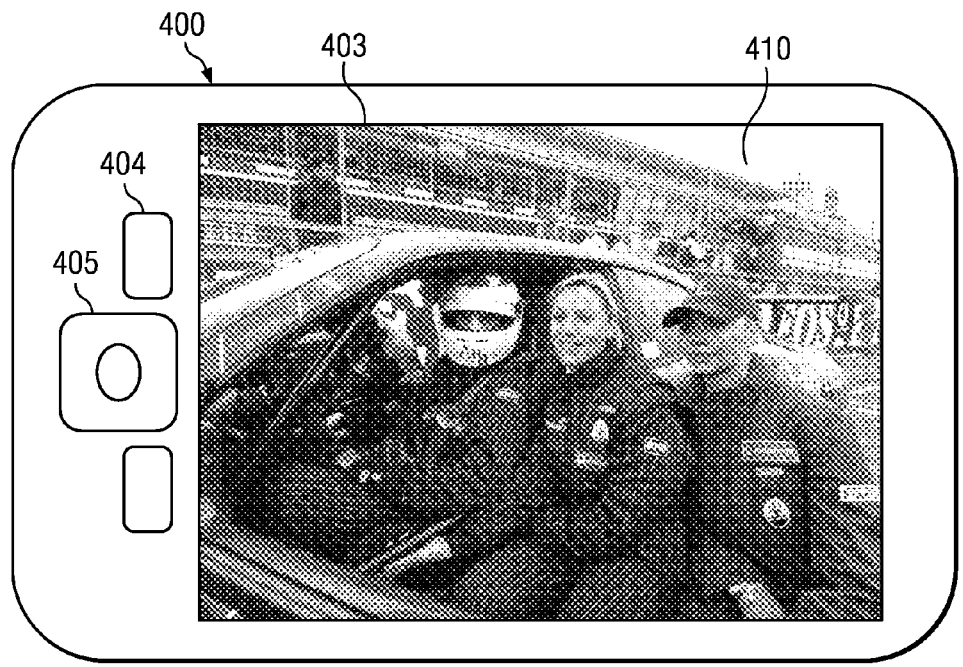
FIGS. 4a to d are screen shot views of an apparatus or views of an application window according to an embodiment.

A controller is configured to display image data or content 410, see FIG. 4a, This image data may represent an image, a video, a document, a map, downloaded internet content, other downloaded content etc. The different alternatives to what image data may be displayed on an electronic device are well-known.

It should be noted that the image data may be stored on said apparatus or remotely at another position or in another apparatus. Image data may also be downloaded while it is being displayed, so called streaming.

By realizing that there is a problem in that the sequence of steps being taken, the location of the corresponding commands and the need to access different menus using different access means is difficult to many users and that the problem can be easily solved using a touch-based interface taking advantage of objects' mobility in such systems a solution as taught herein can be achieved offering a user with a quick and easy way of sharing images.

The teachings herein find particular usage when a large file collection is being browsed and some of the files are being shared as the multiple steps would otherwise have to be repeated.

A controller is configured to receive input indicating a selection area 411 of the image 410 on the display 403.

In one embodiment a controller is configured to receive an input indicating the selection area 411 by input marking the edges of the selection area 411.

In one embodiment a controller is configured to receive an input indicating the selection area 411 by input marking the center point of the selection and setting an area surrounding the center point as the selection. In one embodiment the area is rectangular. In one embodiment the area is square. In one embodiment the area is circular. In one embodiment the area is square. In one embodiment the area is oval.

In one embodiment the controller is configured to analyze the image data surrounding the center point and include data that is of interest according to selection criteria to be part of the selection area 411. Examples of such criteria are faces, vehicles, structures or other forms.

Figure 4B:
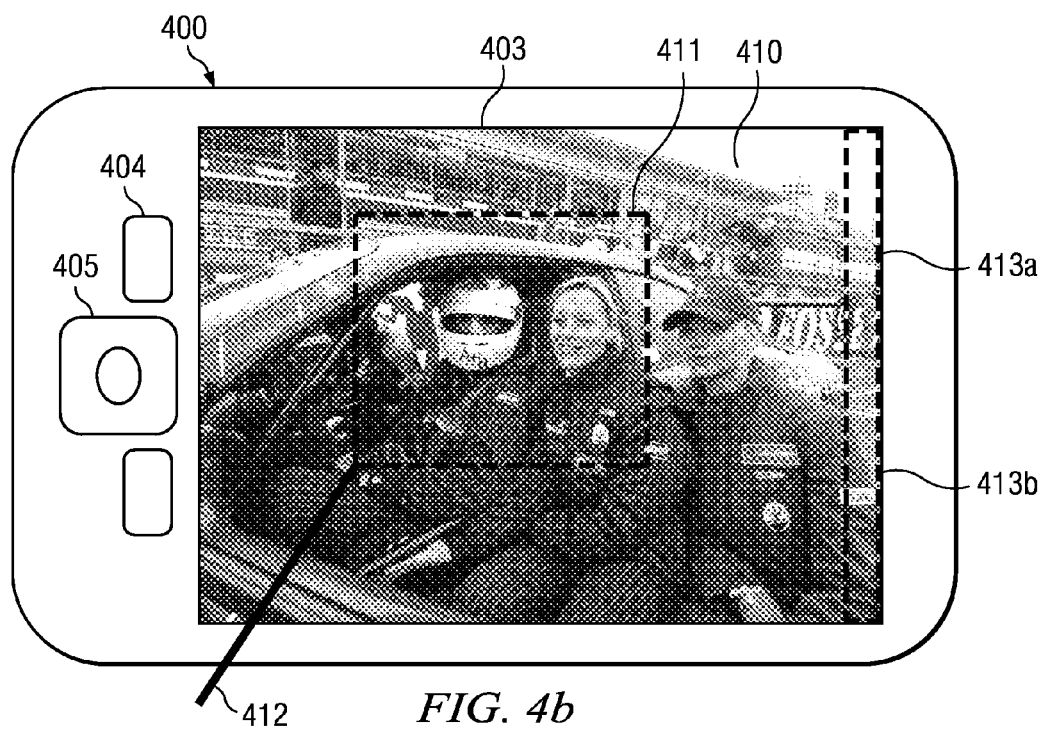

In one embodiment a controller is configured to receive an input indicating the whole image 410 as the selection area 411 by a tap input somewhere inside the image, In one embodiment the controller is configured to mark the selection area 411 as is the case in FIG. 4b where a selection area 411 has been marked by a stylus 412.

In one embodiment the controller is configured to receive input representing a movement of the selection area 411.

In one embodiment this movement input is received through manipulation of a navigation key 405.

In one embodiment this movement input is received through manipulation of a navigation input means such as a computer mouse or a trackball.

In one embodiment this movement input is received through a sliding gesture on the touch sensitive display 403.

In one embodiment this movement input is received through a sliding gesture on a touchpad.

In one embodiment a controller is configured to associate a portion 413 of at least one edge of the display 403 with at least one recipient. In FIG. 4b two portions are shown 413a and 413b both arranged adjacent and associated to the right edge of the display 403. In this embodiment the portions are marked using a dotted rectangle. In one embodiment the portions are not marked.

It should be apparent that different arrangements of the portions are all within the teachings of this invention. Some examples are one portion on each edge, one portion for two edges, one portion for all edges, one portion on one edge and two or multiple portions on another edge.

In one embodiment a controller is configured to receive input indicating a portion of a display or application are and to receive input identifying a recipient and associate the portion with the recipient.

In one example a user marks a portion along a side of the display and drags a contact to that portion. The contact is then associated with that portion for future use.

In one embodiment the recipient being associated with a portion is application specific and may vary between applications. In one embodiment the portions are application specific.

In one embodiment a small icon representing the recipient is displayed in the associated portion.

In one embodiment a small icon representing the recipient is displayed adjacent the associated portion. In one embodiment the small icon is displayed adjacent the display 403. In one such embodiment the icon is printed on a cover of the terminal 400.

In one embodiment the recipient is a contact stored in a contact data base.

In one embodiment the recipient is a group of contacts

In one embodiment the recipient is a service application. In one embodiment the service application is an internet service. In one embodiment the service application is one for sharing images or videos.

In one embodiment the recipient is a combination of at least one contact and at least one service application.

In one embodiment the controller is configured to identify a recipient according to the movement input.

In one embodiment the recipient is the recipient associated with the portion 413 in which the movement input stops.

In one embodiment the recipient is the recipient associated with the portion 413 to which the movement input brings the selection area 411 to. In such an embodiment a user will identify a recipient by dragging the selection area 411 to the associated portion 413.

In one embodiment the recipient is the recipient associated with the portion 413 through which the movement input brings the selection area 411 out of the display 403. In such an embodiment a user will identify a recipient by dragging the selection area 411 out of the display 403 through the associated portion 413.

In one embodiment a controller is configured to send the image data represented by the selection area 411 to the identified recipient.

Figure 4C:
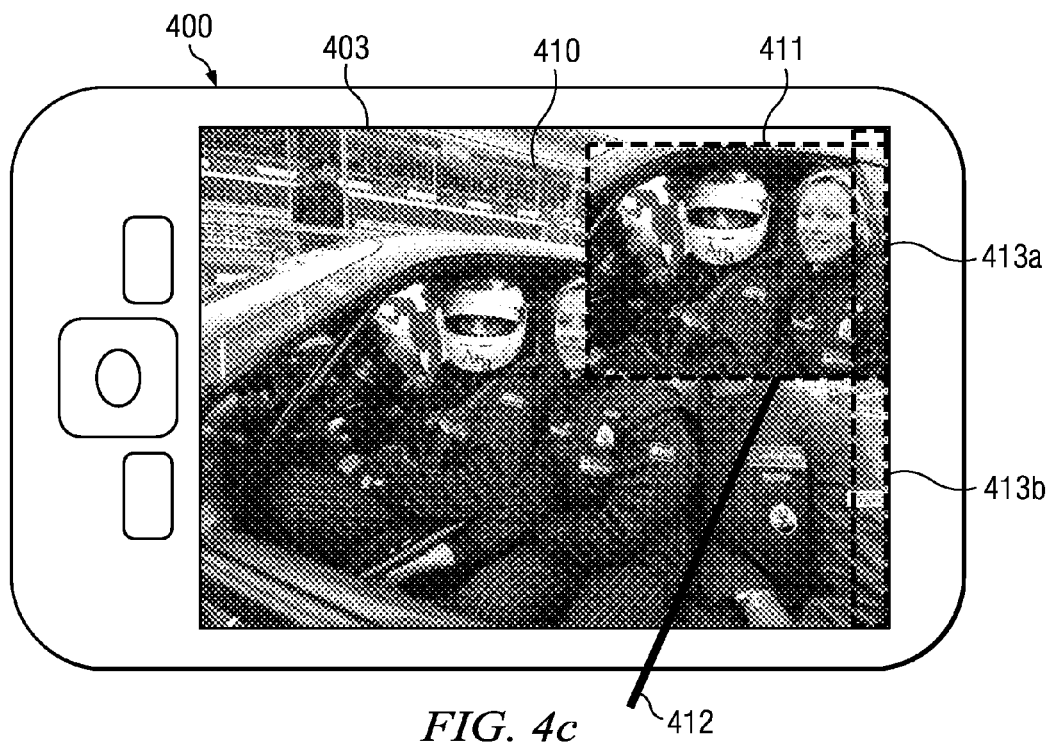

In FIG. 4c a user has dragged the selection area 411 (and its contents) to the upper right portion 413a of the display 403. The content of the selection area 411 is packaged in an appropriate file format and sent to the associated recipient in response thereto.

A user is thus able to share a selection of an image by only making two simple gestures. First marking a selection and then pulling the selection to a portion of the display being associated with a recipient. The function of sharing a selection is thus effected by the two main steps of making the selection and indicating the recipient.

In one embodiment the data of the selection area is sent as a Multi-Media Service (MMS) message.

In one embodiment the data of the selection area is sent as an electronic mail (email).

In one embodiment the data of the selection area is sent using a dedicated communication channel.

In one embodiment the data of the selection area is sent using a special protocol communication channel.

In one embodiment the data of the selection area is sent through a file transfer protocol communication.

Figure 4D:
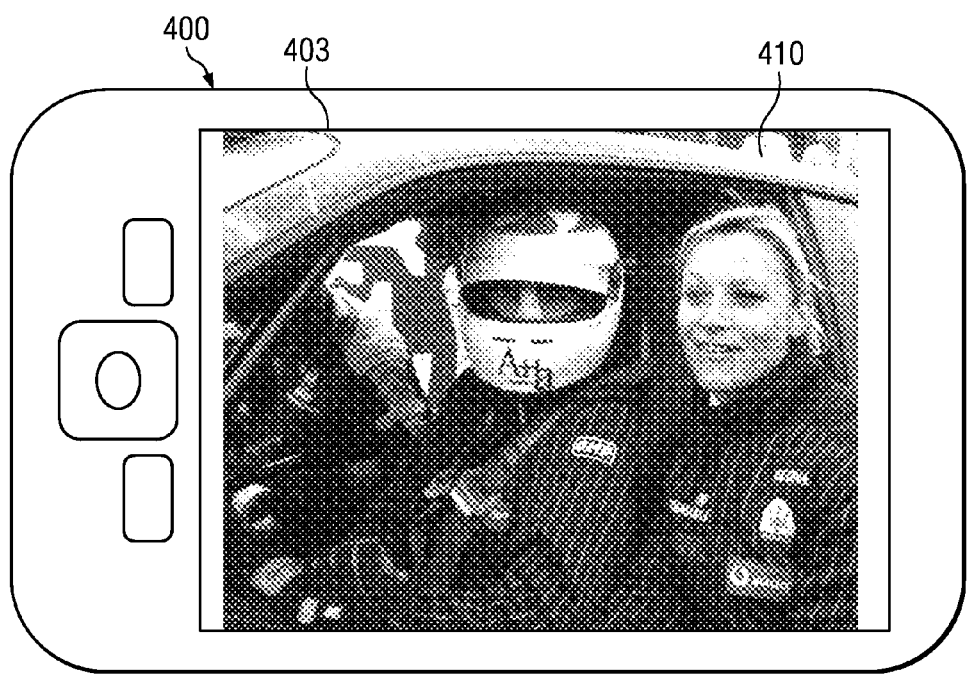

In one embodiment a controller is configured to display the content of the selection area 411 as the image 410 after it has been sent to the recipient, see FIG. 4d. In one embodiment the controller is configured to adjust the data of the selection area 411 to better fit the available display space. In FIG. 4d the content of the selection area 411 has been enlarged and displayed as the main image 410.

In one embodiment a controller is configured to prompt for whether the content of the selection area 411 should be saved as a new file and perform the saving operation in response thereto.

In one embodiment a controller is configured to automatically save the content of the selection area 411 as a new file.

In one embodiment a controller is configured to prompt for whether the content of the selection area 411 should be saved as the original file and perform the saving operation in response thereto.

In one embodiment a controller is configured to automatically save the content of the selection area 411 as the original file.

A user is thus offered a possibility of easily sharing a selection or cut out of an image to a friend or service without having to mark the selection, prompt the device to cut it out, and again prompt the device to send it to a contact and later specify the contact which is done by accessing different menus and using different control means in contemporary devices.

In one embodiment the selection is further saved automatically without further user interaction.

Figure 5:
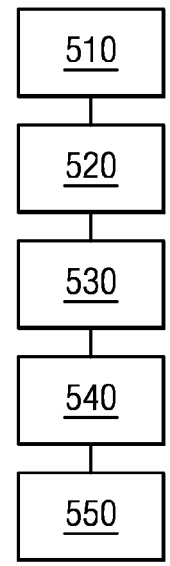
FIG. 5 is a flow chart describing a method according to an embodiment of the application.

FIG. 5 is a flowchart describing a general method according to the teachings herein.

First the controller displays an image (510). The controller then receives an input marking a selection area (520) and an input indicating a movement of the selection area (530) to a portion which is associated to a recipient, thereby identifying a recipient (540). Content being represented by the selection area is then packaged and sent to the identified recipient 550.

The various aspects of what is described above can be used alone or in various combinations. The teaching of this application may be implemented by a combination of hardware and software, but can also be implemented in hardware or software. The teaching of this application can also be embodied as computer readable code on a computer readable medium. Such medium can be any of a Random Access Memory, a Read-Only Memory, a hard drive (magnetic or optical), a Digital Video Disc, A Compact Disc or other storage medium. It should be noted that the teaching of this application is not limited to the use in mobile communication terminals such as mobile phones, hut can be equally well applied in Personal digital Assistants (PDAs), game consoles, media players, personal organizers, computers or any other device designed for displaying image data.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a user will be able to quickly and efficiently share selections of images or other files with friends and family.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone and a desktop computer, it should be appreciated that the teachings of the present application may also be applied to other types of electronic devices, such as media players, video players, photo and video cameras, palmtop, laptop and desktop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. An apparatus comprising:
a controller, wherein said controller is operable to:
   display image data;
   receive input indicating a selection area comprising at least a portion of said image data;
   receive input indicating a movement of the selection area;
   identify a recipient based upon the movement of the selection area; and
   send the at least a portion of said image data in the selection area to the recipient.

2. An apparatus according to claim 1, wherein the controller is further operable to identify a recipient by determining a portion of a display from the input movement of the selection area, the recipient associated with the portion of the display.

3. An apparatus according to claim 1, wherein the recipient is at least one contact.

4. An apparatus according to claim 1, wherein the recipient is a service application.

5. An apparatus according to claim 1, wherein the movement input represents a drag and drop movement.

6. An apparatus according to claim 1, wherein the controller is further operable to receive said input through a touch display.

7. An apparatus comprising:
means for displaying image data;
means for receiving input indicating a selection area comprising at least a portion of said image data;
means for receiving input indicating a movement of the selection area;
means for identifying a recipient based upon the movement of the selection area and means for sending the at least a portion of said image data within the selection area to the recipient.

8. A non-transitory computer readable medium comprising logic, the logic operable, when executed on a processor to:
display image data;
receive input indicating a selection area comprising at least a portion of said image data;
receive input indicating a movement of the selection area;
identify a recipient based upon the movement of the selection area; and
send the at least a portion of said image data within the selection area to the recipient.

9. A method comprising:
displaying image data;
receiving input indicating a selection area comprising at least a portion of said image data;
receiving input indicating a movement of the selection area;
identifying a recipient based upon the movement of the selection area and sending the at least a portion of said image data within the selection area to the recipient.

10. A method according to claim 9, wherein identifying a recipient comprises identifying a recipient by determining a portion of a display from the input movement of the selection area, the recipient associated with the portion of the display.

11. A method according to claim 9, wherein the recipient is at least one contact.

12. A method according to claim 9, wherein the recipient is a service application.

13. A method according to claim 9, wherein the movement input represents a drag and drop movement.

14. A method according to claim 9 further comprising receiving said input through a touch display.

* * * * *